United States Patent [19]

Jarnagin

[11] 4,202,725
[45] May 13, 1980

[54] CONVERGING BEAM FUSION SYSTEM

[76] Inventor: William S. Jarnagin, P.O. Box 127, Concord, Mass. 01742

[21] Appl. No.: 884,482

[22] Filed: Mar. 8, 1978

[51] Int. Cl.$^2$ ............................................... G21B 1/00
[52] U.S. Cl. ........................................................ 176/5
[58] Field of Search .......................... 315/111.4, 111.7; 328/233; 313/62; 176/1, 2, 3, 5

[56] References Cited

U.S. PATENT DOCUMENTS

| | | | |
|---|---|---|---|
| 2,961,558 | 11/1960 | Luce et al. | 176/2 |
| 3,085,173 | 4/1963 | Gibson et al. | 176/3 |
| 3,452,249 | 6/1969 | Cann | 315/111.7 |
| 3,527,977 | 9/1970 | Ruark | 176/3 |
| 3,609,369 | 9/1971 | Goitoru | 176/3 |
| 3,935,503 | 1/1976 | Ress | 328/233 |

Primary Examiner—Samuel W. Engle
Assistant Examiner—S. A. Cangialosi

[57] ABSTRACT

This invention consists of a system which generates clean inexpensive electrical power by fusing isotopes of hydrogen or other lightweight material. Not unlike a cyclotron "turned wrong-side out" ions are accelerated each time they cross a gap between two perforated "bowls" across which is placed high frequency-high voltage. Accelerated ions leave the bowls and go into magnetic gaps or mirror-tubes arranged radially thereon and are generally reflected back through the center of the system between the bowls. By controlled leakage highly energetic ions go out the ends of the mirror tubes and into Return Tubes surrounded by sector or other magnets. Ions are recirculated rapidly and repeatedly through the center of the system. Densities are anticipated to be at least $10^{15}$ and perhaps $10^{20}$'s ions per cc. Probabilities of head-on collision are greatly enhanced by converging the beams of ions or jets of plasma head-on. Head-on collision allows ALL the kinetic energy of an ion pair to go into a reaction because the center-of-mass of colliding ions need not be shifted. (Shifting the CM wastes energy as heat.) The effect is nonlinear; hence spectacularly higher energy yields can accompany head-on collision of ions at relativistic velocities.

1 Claim, 6 Drawing Figures

CONVERGING BEAM FUSION SYSTEM

DISCUSSION OF THE INVENTION

This invention is an AC counterpart of a DC accelerator-fusion system previously filed Ser. No. 788,017, dated Apr. 15, 1977). There are certain fundamental differences in the two systems that justify separate applications for letters patent. The primary difference is that while both systems converge fusionable ions head-on across the mid point of a reaction chamber, the DC system does so by alternately changing the sign of the ions (by electron boosting and stripping techniques) while the AC system uses ions of a fixed charge and alternates instead the voltage applied across an accelerating gap. Other than this brief comparison, the two applications are presented independently. Either application can be read without first reading the other.

The invention at hand consists in part of a hollow spherical electrically conductive Reaction Chamber of "bowl" which is perforated to let through beams of ions or jets of plasma. The reaction chamber or bowl is divided into two hemispheres and separated by a gap across which an alternating potential in the kilovolt range is placed. Injected ions are thence accelerated each time they cross said gap. This much is not unlike cyclotrons. But there are significant differences. The invention at hand effectively turns the cyclotron "wrong side out." It accelerates the ions in a magnetic field-FREE space, thence hurls the ions into magnetic fields. A set of magnetic mirror-tubes are arranged radially about the bowl halves (reaction chamber). In the magnetic mirrors accelerated ions are reflected back along helical pathways, thence repeatedly cross the middle of the reaction chamber. An envelope of these reflected ions appears rather like a dumbbell in shape. Individual ions therein sweep out progressively larger figure-eight-helical pathways, not unlike cyclotron orbits.

Only the vector velocity, not the speed or energy, of the ions is changed in the magnetic fields. Thus the ions soon reach speeds approaching that of light, thence begin to acquire relativistic increases in mass. Accordingly, either the frequency of the applied potential or the strength of the magnetic inductive field or the shape of the magnetic mirror/s must be modified to keep the ions in phase with the voltage changes across the accelerating gap. It is better from an average beam density point of view to operate the system with a fixed frequency rather than a pulsed frequency. Ions which gain too much speed and energy to be reflected back "leak" out the ends of magnetic mirrors into Return Tubes which are themselves surrounded by either sector magnets or solenoids bent around so as to direct and focus the high energy ions headon across the midpoint of the reaction chamber.

Thus ions build up energy within the confines of the magnetic mirrors and leak into larger loops of the system and in both tubes are made to corss the midpoint of the system repeatedly and head-on. The idea behind the (enlarged) magnetic mirror tubes is to provide a space for the slower moving ions to gain energy without getting in the way of the faster ions too much. Slower injected ions initially follow helical cyclotron pathways around the main axis of a tube; then as they gain higher energies they travel more along the main axis of the mirror tube, leak into a return tube and go into orbit along the main axis of a loop until they colliding with something—another ion or the container wall.

Average ion energies over one MeV (tera temperatures) should be readily attainable with total magnetic induction fields on the order of one Weber/meter$^2$ by this system. Ion densities of $10^{15\text{-}20's}$ per cubic centimeter are anticipated (plenty ample for practical rates of nuclear fusion). Ion densities are enhanced by alternate gradient and other focussing techniques.

Ion density is a major problem in certain other approaches to nuclear fusion especially colliding beams. This invention, however, assures practical ion densities ($10^{15\text{-}20's}$ per cc) by the following:

1. Converging some 20-100 beams of ions or jets of plasma head-on toward midpoint of the reaction chamber, each beam or jet carrying about $10^{14}$ ions/cc.

2. Focussing the ions onto the midpoint of the system. Alternate gradient focussing can be used on the Return Tubes (see drawings) while focussing rings can be placed at all apertures going into the Reaction Chamber. Ions can thus be focussed and "hard focussed" down to $10^{20's}$ per cc.

3. Rapid (mega hertz) recirculation of ions in time. Ion densities of beams are ordinarily tens of millions of times less dense than that of solid targets. But equivalent densities can be reached by circulating the ions toward a point tens of millions of times per second, as this invention does.

4. High symmetry and enhanced self-pinching of ion beams: Electrostatic repulsion ordinarily tends to scatter beams of charged particles and break up any magnetic field circulating around them, hence pinching the particles toward their major axis of velocity. However, this invention arranges the incoming beams of ions in a highly symmetric, spherically radial (pin cusion) form and thus squeezes the ions together "whether they like it or not."

DISCUSSION OF THE DRAWINGS

Figure 1:
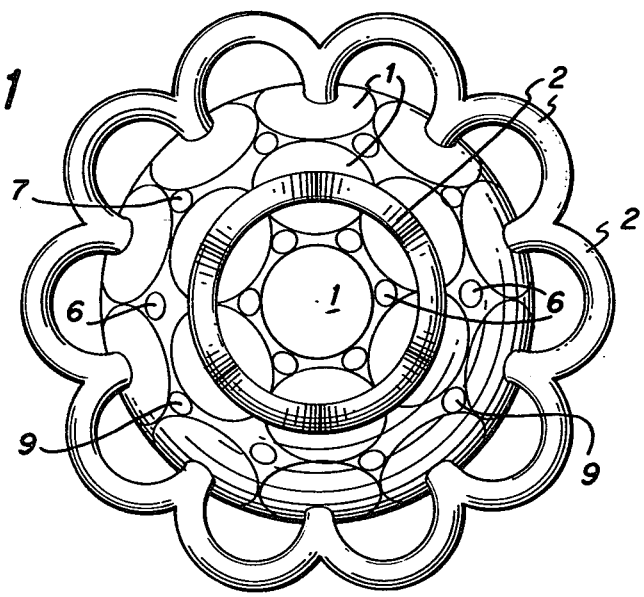
FIG. 1 shows an outside view of the assembled invention, except for reasons of clarity deflecting electromagnets described in the text have not been shown around the outer tubes.
Figure 2:
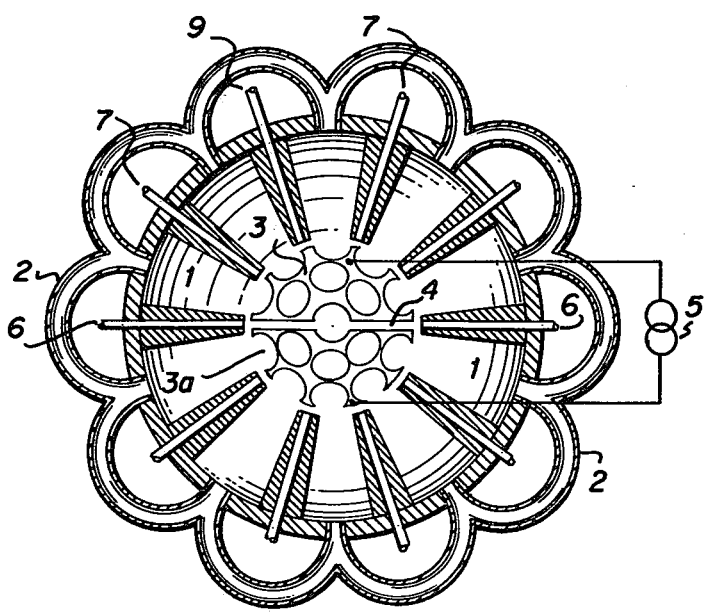
FIG. 2 shows a cutaway view of the invention, revealing two perforated bowls across which an oscillator is placed and through which ions are accelerated.

FIG. 1 is a typical view of the assembled invention with parts numbered the same as in FIG. 2, which is a cross section of the same viewshowing Magnetic Mirror Tubes 1 and Return Tubes 2 converging onto a divided Reaction Chamber 3. Perforations 3a in said Reaction Chamber 3 let ion beams or plasma jets into and through the reaction chamber. An Acceleration Gap 4 is left between Reaction Chamber halves, across which gap a high frequency kilovoltage (HF KV)

Figure 3:
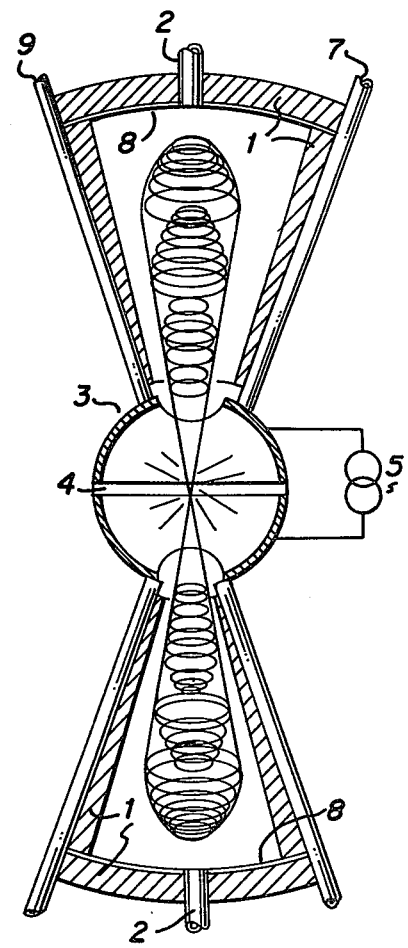
FIG. 3 shows the typical helical or dumbell pathway swept out by the ions as they move outward from and return to the bowls.

Power Supply 5 is placed. Said HF KV power supply accelerates ions injected by Injector 6 across the halves of the reaction chamber and discharges the ions into Magnetic Mirror Tubes 1, which in turn reflect or partially reflect the ions back along helical-figure-eights toward the center of the reaction chamber as suggested by FIG. 3. Magnetic Mirror Tubes 1 are wound by coils (generally supercooled) such that more coils are wound at the ends fartherest removed from the reaction chamber - the idea being to bend and crowd the magnetic flux lines inward toward the major axis of the tube. (Ions tend to turn away from increasing magnetic flux). Surrounding Return Tubes 2 are other magnetic coils or iron magnets (not shown) designed to deflect and bend the ions back around to the reaction chamber with little or no loss of energy. (Only the velocity vector but not the speed or energy of ions changes in a magnetic field.) The figures show typical Output Tubes 7 connecting to Heat Exchange Liner 8 (such as lithium) which can double as an optically reflective surface to return synchrotron and Bremsstrahlung radiation to the Reaction Chamber. The figures also show typical Vacuum Pump Tubes 9. Return Tubes 2 are shown forked, the idea being to let ions recirulate toward the reacion chamber whether orbitting clockwise or counterclockwise.

Figure 4:
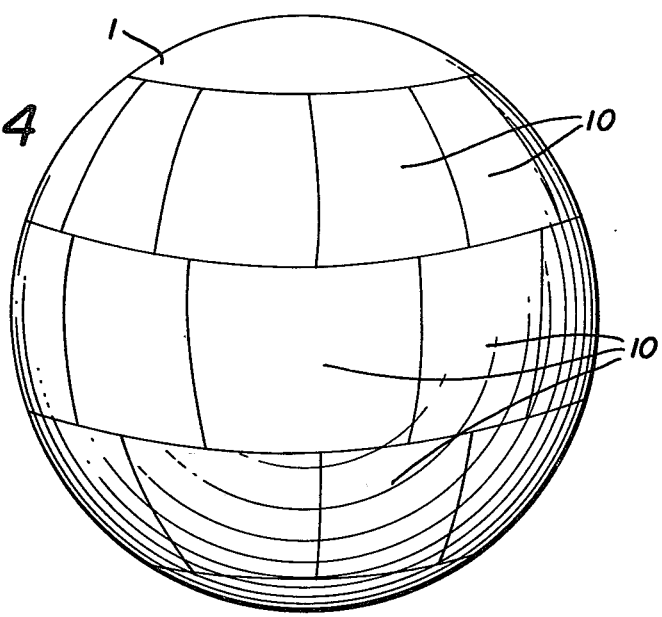
FIG. 4 shows a smooth spherical embodiment of the invention containing magnetic mirrors and c-magnets in contrast with the return tubes of FIG. 1.
Figure 5:
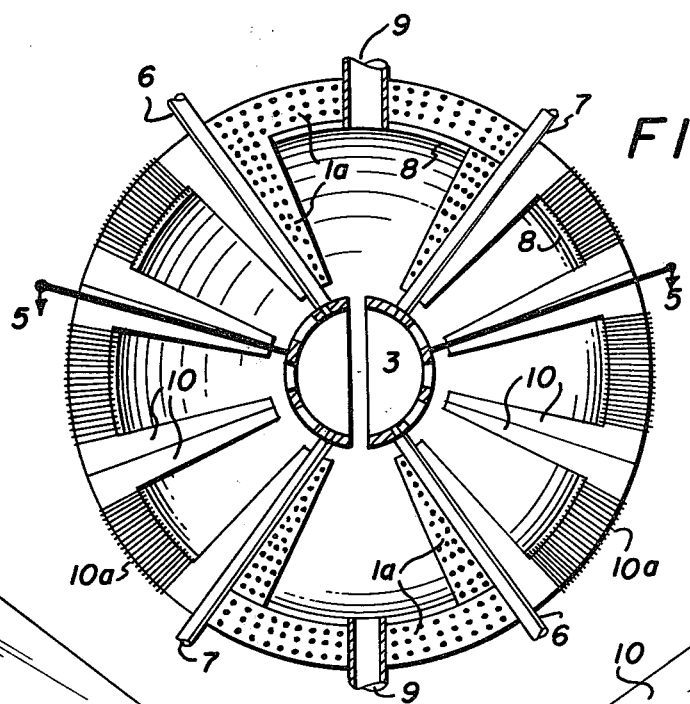
FIG. 5 shows a cutaway of FIG. 4, showing magnetic mirrors and c-electromagnets in which ions are recycled to the reaction center of the electrode bowls.
Figure 6:
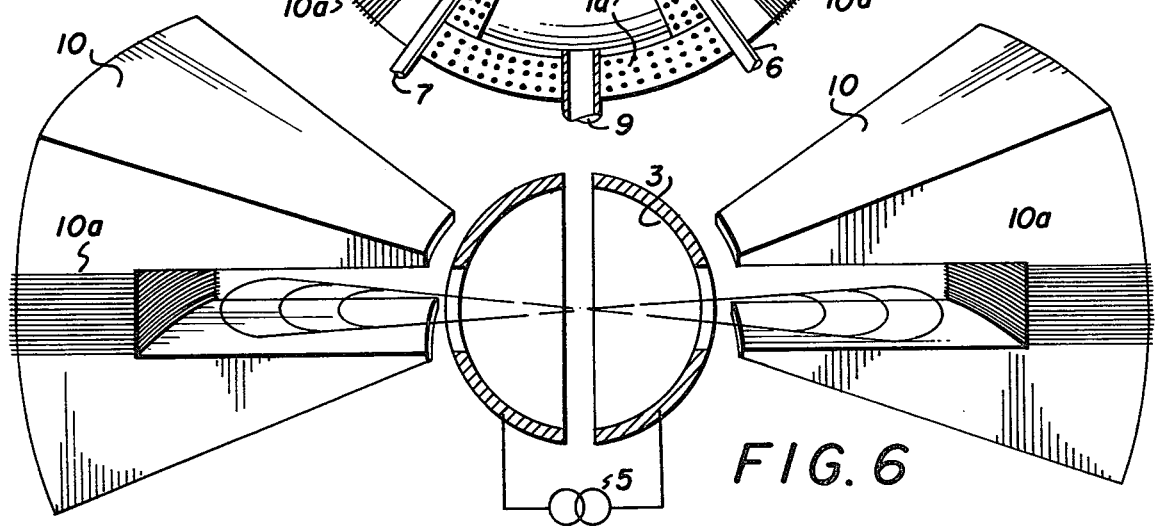
FIG. 6 shows an enlargement of a typical pair of c-electromagnets of FIG. 5, and ion pathways therein.

FIGS. 4, 5 and 6 show another version of this invention, still a Converging Beam Nuclear Fusion System but with C-Magnets 10 in place of some of the Magnetic Mirror Tubes 1 of the version shown in FIGS. 1 and 2. FIG. 4 shows a typical "igloo" construction of the system with C-Magnets 10 packed equatorially around the center and with a Magnetic Mirror 1 "plugged in" at the top and bottom (in a circular wedge space better suited for that design than a C-Magnet). Input-output tubes are similar to those in FIGS. 1 and 2 and are not all duplicated in FIGS. 4 and 5.

FIG. 6 is a cross section of FIG. 5 from the same view, and an enlarged drawing of a typical pair of opposing C-Magnets 10 is shown below connected by the dashed lines. The various numbers represent the same components as in FIGS. 1 and 2, the only new ones being Magnetic Mirror Coils 1a and C-Magnet 10 with its C-Magnet Windings 10a. Said windings are wound in opposite senses per pair of opposing magnets in order to return ions along figure-eight pathways through the center of the Reaction Chamber 3. Ions in said C-Magnets 10 are deflected in a flatter plane than in Magnetic Mirrors 1, as denoted by the respective drawings in FIGS. 2 and 6.

I claim:

1. A converging beam nuclear fusion system comprising a plurality of diametrically opposed wedges joined to form a spherical reaction chamber, said wedges having an interior surface positioned at a predetermined fixed distance from the center of said chamber so as to form an interior spherical space; a first plurality of said wedges containing electromagnet means of C-shape cross section, a second plurality of said wedges containing magnetic mirror means, two hemispherical electrically conductive bowls located in the interior spherical space so as to form a gap therebetween, said bowls each having at least one perforation; a high frequency high voltage power source connected across said bowls; at least one ion injection means operatively connected to at least one of said bowls, at least one output means operatively connected to at least one of said bowls, a vacuum pump means connected to said reaction chamber, wherein ions are injected into said bowls, therein accelerated across the gap of said bowls toward one of said spherical wedges whereupon said ions are deflected and returned to one of said bowls, accelerated across said gap to the diametrically opposed wedge where it is again deflected to return to other of said bowls so as to form a plurality of beams having figure eight pathways, and where the intersection of each FIG. 8 pathway is located at the center of the reaction chamber for the purpose of enhancing the density and probability of head-on collision of the ions.

* * * * *